United States Patent [19]
Hughes

[11] Patent Number: 5,247,302
[45] Date of Patent: Sep. 21, 1993

[54] ENTROPY-BASED SIGNAL RECEIVER

[75] Inventor: Michael S. Hughes, Ames, Iowa

[73] Assignee: Iowa State University Research Foundation, Inc., Ames, Iowa

[21] Appl. No.: 906,571

[22] Filed: Jun. 30, 1992

[51] Int. Cl.$^5$ .................... G01S 13/08; G01V 3/12; G01V 3/38
[52] U.S. Cl. .................................. 342/22; 342/126
[58] Field of Search ................... 342/22, 126

[56] References Cited

U.S. PATENT DOCUMENTS

| | | | |
|---|---|---|---|
| 3,713,156 | 1/1973 | Pothier | 342/22 |
| 4,481,517 | 11/1984 | Brown | 342/22 |
| 4,648,057 | 3/1987 | Wagstaff et al. | 342/192 X |
| 4,965,732 | 10/1990 | Roy, III et al. | 342/147 X |
| 5,068,597 | 11/1991 | Silverstein | 342/192 X |
| 5,097,331 | 3/1992 | Chen et al. | 358/138 |
| 5,107,841 | 4/1992 | Sturgill | 128/661.09 |
| 5,124,709 | 6/1992 | Baron et al. | 342/192 |
| 5,164,730 | 11/1992 | Jain | 342/25 |

OTHER PUBLICATIONS

Q. T. Zhang, "An Entropy-Based Receiver for the Detection of Random Signals & Its Application to Radar", *Signal Processing* 18 (1989) 387–396 Elsevier Science Publishers B.V.

Primary Examiner—John B. Sotomayor
Attorney, Agent, or Firm—Robert E. Malm

[57] ABSTRACT

The entropy-based signal receiver uses the entropy of a received signal or a quantity that is closely related to entropy as the means to measure changes in the signal as a function of time or origin. The changes that are of interest are those associated with either signal level or signal structure. Entropy is a measure that responds in some fashion to either type of change. The entropy-based signal receiver transforms time segments of a received signal into entropy-related quantities. By comparing entropy-related quantities of received signals, one can obtain information about the emitters of the received signals and the nature of the medium through which the signals were propagated. The sensitivity of the entropy-based receiver is significantly better than the more conventional energy-based receiver in detecting the changes in a signal that result from reflection or scattering by inhomogeneities in a wave-propagating medium.

17 Claims, 2 Drawing Sheets

ENTROPY-BASED SIGNAL RECEIVER

BACKGROUND OF THE INVENTION

This invention relates generally to receivers of electrical signals in apparatus such as radar and sonar wherein electromagnetic or acoustic waves are used to "probe" an environment of uncertain composition and the resulting scattered waves from the environment are analyzed for the purpose of determining the nature of the environment. More particularly, the invention relates to the processing methods practiced by the signal processors in such receivers.

The use of probing signals for the identification of objects, inhomogeneities, or disturbances in a wave-propagation-supporting medium has been a basic environmental investigative technique for centuries. However, only since the middle of the twentieth century has the knowledge of signal detection principles and the capability of implementing complicated signal processing designs in hardware resulted in sophisticated signal processors that test the theoretical limits to signal detection and analysis.

The genesis of radar and sonar signal processors were the simple but effective square-law detector and its close relative, the envelope detector, that were used in the detection of radar and sonar pulses in the World War II era. It was subsequently discovered that the so-called correlation processor, which computed the correlation of received signals with replicas of the transmitted signal, was theoretically more effective in extracting the returning signals from the everpresent background noise and interference. Interestingly, the envelope detector can be a very good approximation to the correlation processor when the transmitted signal is a simple pulse and the parameters of the envelope detector are properly chosen.

The square-law detector, the envelope detector, and the correlation detector all share one attribute—they all calculate a quantity proportional to the energy of the received signal. In the case of received signals that are replicas of the transmitted signal, obtained, for example, by reflection from a plane surface, the use of an energy measure as the means of detection is well-supported by theory which shows that with such measures, the highest possible signal-to-noise ratio is obtained. However, there is no reason to believe that energy-measure processors are the most effective detectors of received signals that result from reflection or scattering of the transmitted wave by more complicated media structures and compositions. In such situations one is looking for changes in received signals as a function of time and direction of arrival and not whether a delayed and attenuated version of the transmitted signal is being received. In these circumstances, certain experimental results suggest that entropy measures are significantly more effective than energy measures as a means of detecting such complicated returning signals.

BRIEF SUMMARY OF INVENTION

The entropy-based signal receiver uses the entropy of a received signal or a quantity that is closely related to entropy as the means to measure changes in the signal as a function of time or origin. The changes that are of interest are those associated with either signal level or signal structure. Entropy is a measure that responds in some fashion to either type of change.

The entropy-based signal receiver transforms time segments of a received signal into an entropy-related measure. By comparing entropy-related measures of received signals, one can obtain information about the emitters of the received signals and the nature of the medium through which the signals are propagated. The sensitivity of the entropy-based receiver is significantly better than the more conventional energy-based receiver in detecting the changes in a signal that result from reflection or scattering by inhomogeneities in a wave-propagating medium.

The entropy-based signal receiver in combination with an infrared radiation lens and detector can be used to monitor the temperatures of devices on an integrated circuit chip by scanning the chip and obtaining an entropy-related measure of the infrared radiation emitted by the devices. This type of signal receiver is also appropriate for imaging radars operating at millimeter and shorter wavelengths where one is interested in determining the shape and contours of a reflecting object. The present invention can also be used in ultrasonic acoustic probing systems used for medical diagnostics and nondestructive testing of manufactured items. In such systems, the test object is irradiated with a narrow beam of ultrasonic acoustic waves. Any discontinuities or inhomogeneities will cause portions of the incident acoustic waves to be scattered. By transforming these scattered signals into entropy-related quantities, the entropy-based signal receiver permits the shapes and contours of regions of different densities, that are concealed within the subject, to be visualized with greater sensitivity than has hitherto been possible.

DESCRIPTION OF THE PREFERRED EMBODIMENT

Figure 1:
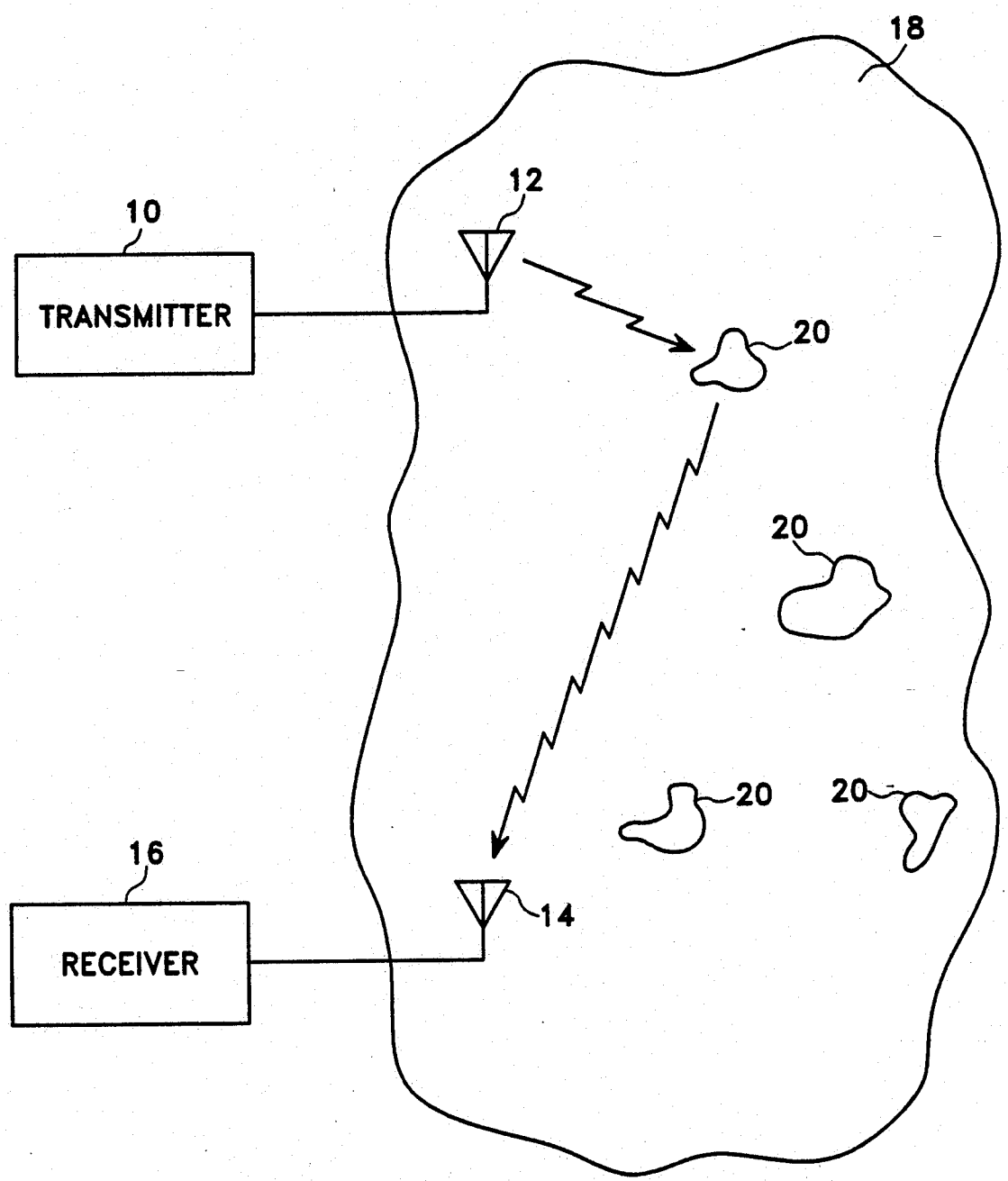
FIG. 1 shows a generic version of a probing system for characterizing an environment by means of the waves reflected or scattered by inhomogeneities.

For the purposes of this discussion, a system for characterizing an environment by means of waves reflected or scattered by inhomogeneities of any type will be called a probing system. A generic version of a probing system is shown in FIG. 1. It is comprised of (1) a transmitter 10 which generates electrical signals, (2) a wave-generating means 12 which converts the electrical signals into waves (e.g. an antenna in the case of radio-frequency electromagnetic (R-F EM) waves, a modulatable light source and reflector or lens in the case of optical-frequency electromagnetic (O-F EM) waves, or a transducer in the case of acoustic waves); (3) a wave-converting means 14 which converts received waves into electrical signals (e.g. an antenna (R-F EM waves), a reflector or lens and a light detector (O-F EM waves), or a transducer (acoustic waves)); and (4) a receiver 16 that transforms the received electrical signals into measures from which the structural or compositional characteristics of the environment in which the probing system operates can be deduced.

The operating premise of the system is that the wave-generating means 12 and the wave-converting means 14 are coupled together by the wave-propagating medium 18 and that the received waves that result from reflection or scattering from inhomogeneities 20 will be affected by the character of the inhomogeneities.

The wave-generating means 12 and the wave-converting means 14 may be individual devices or arrays of devices. They may be highly-directive in their radiation patterns or omnidirectional. They may be co-located or spaced apart as shown in the figure. With the proper choice of transmitted signals, the wave-generating means and the wave-converting means may be a single device.

Figure 2:
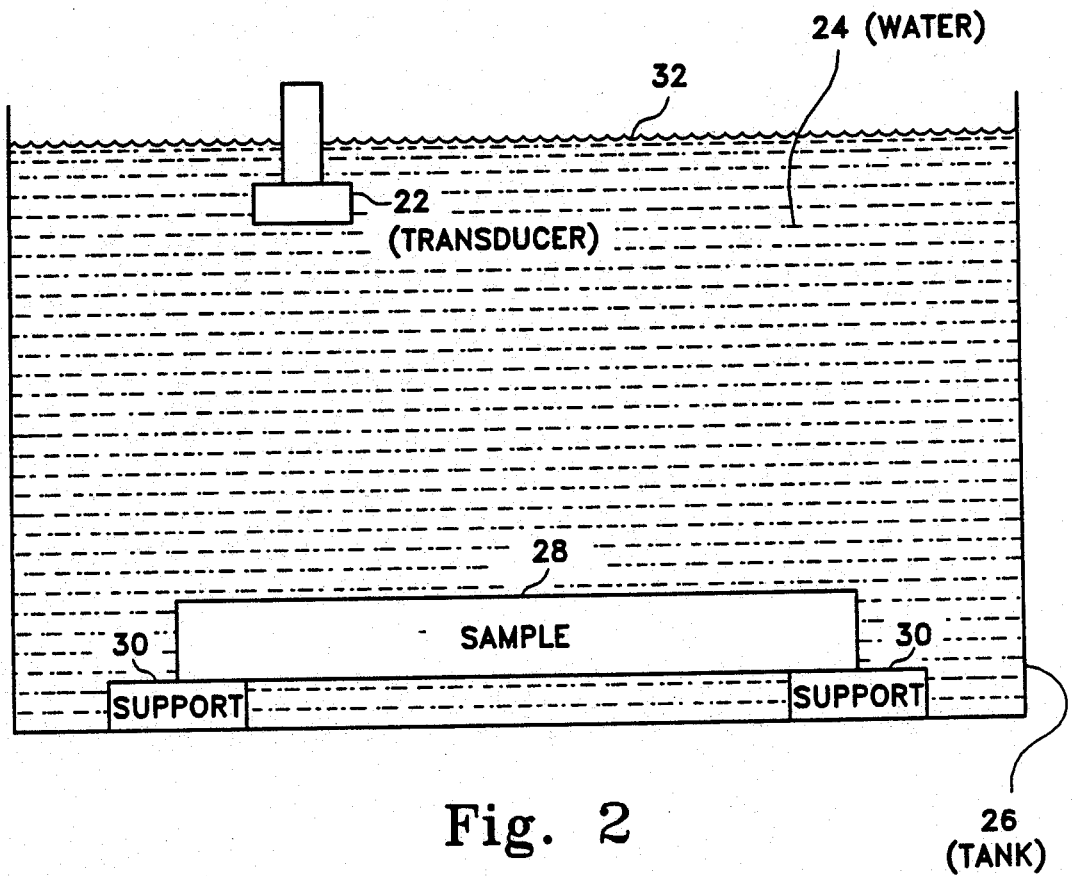
FIG. 2 illustrates a probing system for detecting and characterizing discontinuities and inhomogeneities within a test object by means of ultrasonic acoustic irradiation of the test object.

For example, the arrangement for a non-destructive testing application might be as shown in FIG. 2. The functions of the wave-generating means 12 and the wave-converting means 14 are performed by the single narrow-beam acoustic transducer 22 having a downward-pointing beam. The transducer is immersed in water 24 contained in tank 26. The sample to be non-destructively tested 28 rests on supports 30 near the bottom of the tank. A three-dimensional determination of voids in the sample is obtained by (1) pulsing the transducer and analyzing the signal returns as a function of round-trip propagation time and (2) raster-scanning the transducer in a plane parallel to the water surface 32.

Figure 3:
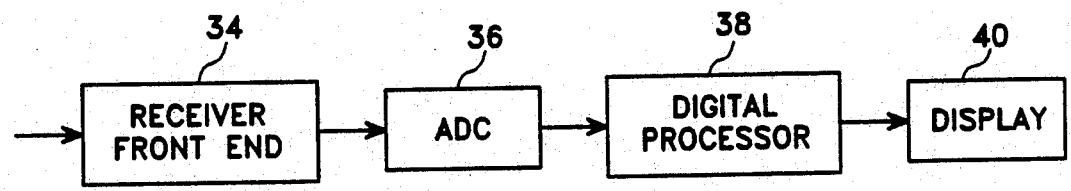
FIG. 3 shows the functional block diagram of the entropy-based signal receiver.

The functional block diagram of the receiver 16 (FIG. 1) is shown in FIG. 3. The receiver is comprised of a front end 34 which amplifies the received signals and translates the amplified signals to baseband (i.e. a frequency band extending from zero frequency to some higher value) if the transmitted signals are not already at baseband.

The translating means can be a simple envelope detector if the transmitted signals are amplitude-modulated sinusoids. If the transmitted signals are phase- or frequency-modulated sinusoids, then the translating means can be implemented with two mixer-lowpass filter combinations—one combination for generating the inphase baseband component and the other for generating the quadrature baseband. The inphase combination functions by forming the product of the received signals and a cosine-function signal at the nominal center frequency of the transmitted signals and removing the upper sidebands from the product signal by means of the lowpass filter. Similarly, the quadrature combination functions by performing the same operations with a sine-function signal substituted for the cosine-function signal.

It will be assumed in the material that follows that both inphase and quadrature baseband signals are produced at the output port of the receiver front end 34. A single-baseband signal output from the receiver front end will be recognized as a special case of the more general two-signal case.

The two baseband signals from the receiver front end 34 are independently sampled and digitized at time intervals of $\chi$ by the p-bit analog-to-digital (A/D) converter 36 where the reciprocal of $\chi$ is equal to or greater than the Nyquist rate and p is an integer typically equal to or greater than 8. The two p-bit word sequences from the A/D converter enter the digital processor 38 which optionally may combine the two word streams into a single word stream by selecting the larger of corresponding words in the two word sequences, by summing the absolute values of corresponding words in the two word sequences, or by summing the squares of the values of corresponding words in the two word sequences and extracting the square root of the result. Persons skilled in the art will recognize other possibilities for combining two word sequences into a single word sequence while at the same time conserving the essential information content of both word sequences.

It may be desirable in some situations to perform repeated scans and average the data so that more consistent and reliable results can be obtained. In order to accommodate the increased precision of averaged data, the word lengths utilized in the digital processor 38, denoted by q in the material that follows, should be greater than p.

It will be assumed for simplicity that subsequent processing by the digital processor 38 involves a single word sequence $f_m$ where m is an integer that identifies the sequence of the samples in time. If the two original sequences are not combined into a single sequence, then the processing described below is performed on each of the sequences.

The digital processor 38 divides the word sequence into groups of M words. The groups may overlap if abrupt changes in successive outputs of the digital processor are to be minimized. For each M-word group the digital processor generates an entropy-related number. The term "entropy-related" means that the output of the digital processor is a monotonically-increasing function of the entropy of the group of M q-bit words from which the output derives.

The entropy-related outputs from the digital processor 38 can be used to detect and characterize departures from homogeneity in the test environment. The rationale for transforming the input signal segments into entropy-related quantities rather than energies (as is commonly done) becomes apparent when one considers the scattered signals that result when an inhomogeneity in the wave-propagating medium is illuminated with a pulsed waveform. The scattered wave is a summation of attenuated and delayed versions of the incident pulsed waveform resulting in a signal structure that typically appears to be considerably different from the incident waveform. The same is true of incident signals other than pulsed waveforms. The utilization of the energy of the scattered waveform as a means of characterizing the inhomogeneity is a one-dimensional attempt that obviously does not fully use all of the information contained in the scattered waveform. Two inhomogeneities might scatter the same amount of energy and yet might have completely different effects on the structure of the scattered signal.

Entropy, on the other hand, (and derivatives of this quantity) is a statistical characterization of the scattered signal and is affected by both the signal energy and the signal structure. Thus, an entropy measure of the scattered signal permits more sophisticated deductions to be made about the nature of the inhomogeneities that cause the scattering to occur.

The entropy-related numbers from the digital processor 38 are supplied to the display 40 where they are displayed in accordance with a user's needs. In the non-destructive testing case illustrated in FIG. 2, for example, for a fixed position of the transducer 22, the entropy-related numbers may be plotted as ordinates against propagation times as abscissas in a Cartesian coordinate system.

For a one-dimensional scan of the transducer 22, the entropy-related numbers may be plotted as spots of different shades of gray in a Cartesian coordinate system, the transducer position being the abscissa and the propagation time being the ordinate of a spot.

For a two-dimensional scan of the transducer, the entropy-related numbers may be plotted as spots of different shades of gray in a Cartesian coordinate system, the two coordinates of the transducer position corresponding to the ordinate and abscissa of a spot. In this case, the entropy-related numbers are restricted to a particular propagation time.

In accordance with the usual definition of entropy as a measure of information content, the entropy of a group of words is given by the equation $$H = - \sum_{k=1}^{N} p(k;\epsilon)\log_2[p(k;\epsilon)] \quad (1)$$

where $N (= 2^q)$ is the number of distinct words that can be represented by a q-bit word and $p(k;\epsilon)$ is the number of occurrences of the magnitude $k\epsilon$ in a group of words divided by the number M of words in the group. The quantity $\epsilon$ is defined by the equation $$\epsilon = \frac{\beta - \alpha}{N} \quad (2)$$

where $\alpha$ and $\beta$ are respectively the lower and upper bounds of the input word sequences $f_m$ which the digital processor 38 transforms into entropy-related outputs.

In a recent publication, the inventor described a set of experiments in which he performed a raster scan of a rectangular block of Plexiglas with a pattern of drill holes—artificial "flaws"—in an experimental configuration similar to that shown in FIG. 2. He compared two energy-based receivers with an entropy-based receiver and found that the entropy-based receiver was two to three times more sensitive to the presence of small defects in the specimen than the energy-based receivers. (Michael S. Hughes, "A comparison of Shannon entropy versus signal energy for acoustic detection of artificially induced defects in Plexiglas", *J. Acoust. Soc. Am.* 91 (4), Pt. 1, April 1992.)

The entropy of a word group as defined by equation (1) is one acceptable functional definition of the processing performed by the digital processor 38 in transforming word groups into entropy-related quantities. An alternative definition of the transformation performed by the digital processor in obtaining entropy-related outputs from word groups can be obtained by rewriting equation (1) in terms of the density distribution function w(y) of the quantity y where y represents the continuum of values from which the discrete word values $f_m$ are selected. The quantity w(y) is defined in terms of $p(k;\epsilon)$ by the equation $$p(k;\epsilon) = \frac{\epsilon w(y_k)}{M\chi} \quad (3)$$

The quantity w(y) is normalized such that $$\int_{\alpha}^{\beta} w(y)dy = M\chi \quad (4)$$

Substituting expression (3) for $p(k;\epsilon)$ in equation (1) we obtain $$H = - \sum_{k=1}^{N} \frac{\epsilon w(y_k)}{M\chi} \log_2[w(y_k)] - \log_2\left(\frac{\epsilon}{M\chi}\right) \quad (5)$$

In the limit as $\epsilon$ goes to zero the summation in equation (5) becomes an integral.

$$H = - \frac{1}{M\chi} P \int_{\alpha}^{\beta} w(y_k)\log_2[w(y_k)] - \log_2\left(\frac{\epsilon}{M\chi}\right) \quad (6)$$

where P denotes the principal value.

The second term on the right of equation (6) reveals that entropy increases logarithmically with decreasing signal quantization step $\epsilon$ and increasing group period $M_\chi$. Thus, the second term is a function only of the processing parameters and not the structure of the signal.

The term containing the integral, which we denote by $H_c$, is a quantity that is independent of quantization step size $\epsilon$ and for this reason is a more convenient basis of the design of the digital processor 38 than is the entropy H. The integral term is the essence of entropy in that it is a function of both signal level and signal structure which are characterized by the density distribution function w(y). Both H and $H_c$ are effective characterizers of signal level and signal structure and either can serve as a basis of deduction concerning the inhomogeneities in the propagation medium.

In order to use $H_c$ as the functional definition of the transformation performed on the input word groups by the digital processor 38 in obtaining entropy-related outputs, the w(y) terms must be expressed in terms of the words $f_m$ in an input word group. It can be shown that $$w(y) = \sum_{n=-N}^{N} a_n e^{j\pi n(y-\mu)/\lambda} \quad (7)$$

where $$\lambda = (\beta - \alpha)/2 \quad (8)$$
$$\mu = (\beta + \alpha)/2$$

and $$a_n = \frac{je^{j\pi n\mu/\lambda}}{M(\beta - \alpha)} \sum_{m=1}^{M} \frac{1}{\pi n\lambda(f_{m+1} - f_m)} (e^{-j\pi n\lambda f_{m+1}} - e^{-j\pi n\lambda f_m}) \quad (9)$$

The integral in equation (6) can be evaluated using any one of a number of standard numerical integration techniques (see e.g., H. Margenau and G. M. Murphy, *The Mathematics of Physics and Chemistry*, 2d ed. D. Van Nostrand, New York, 1956, pp 473–82).

The quantity $H_c$, as defined by equations (6) through (9), is an alternative entropy-related functional definition of the transformation process performed by the digital processor 38, the inputs to the process being the word groups and the outputs being $H_c$.

If word groups from two word sequences are converted into two sequences of entropy-related numbers, the entropy-related sequences can be combined into a single entropy-related sequence for output to the display 40 by selecting the largest of corresponding numbers in the two entropy-related sequences, summing corresponding numbers, or taking the square root of the sum of the squares of corresponding numbers.

There exist many other ways for generating entropy-related numbers from input word groups that can be obtained from manipulations, partitions, rearrangements, and approximations of equation (1). Any such alternatives that evolve from the density distribution function w(y) that characterizes the analog received signal segments or the normalized frequency-of-occurrence $p_k$ of the k'th amplitude level of the digitized received signal segments are within the spirit and scope of the invention.

An entropy-based system for characterizing naturally-occurring signals and the wave-propagating mediums through which they pass is obtained by combining the entropy-based signal receiver with an antenna or transducer, depending on the nature of the waves to be received. A particular configuration that would be useful for monitoring the temperatures of devices on an integrated circuit chip consists of an infrared imaging system—lens and infrared light detector—mounted on a raster-scan assembly and the entropy-based signal receiver. Repetitive scanning of an integrated circuit chip in a raster pattern would result in a display of the entropy-related quantity associated with the infrared radiation produced at each point on the integrated circuit chip. Since the radiation from a point on the chip and its entropy is monotonically related to the temperature of the point, the entropy-related quantities are readily translated into temperatures.

A similar system configuration utilizing a visible light imaging system and visible light illumination could be used for detecting and characterizing bubbles, refractive index striae, and other imperfections in optical glass parts.

An entropy-based radar-type probing system is obtained by combining a transmitter, directive transmit and receive antennas, appropriate means to enable the antennas to systematically scan a given region of space, and the entropy-based signal receiver. The intersection of transmit and receive antenna beams determines the region of space from which reflected or scattered waves can be received. A closer specification of the scattering region from which the scattered waves originate is obtained by measuring the propagation time between transmitter and receiver. Such a configuration would permit objects, discontinuities, or other inhomogeneities in the wave-propagating medium to be detected and characterized.

A similar configuration utilizing acoustic waves and transducers to launch and receive them would permit the investigation and characterization of media that does not support electromagnetic propagation but does support the propagation of acoustic waves.

What is claimed is:

1. A signal receiver which detects changes in an electrical signal by transforming a plurality of time segments of said signal into entropy-related quantities, the differences between said entropy-related quantities being a measure of change among said signal segments, said signal receiver comprising:

an analog-to-digital converter (ADC) which converts each of said signal segments into at least one sequence of digital words w(m,k), m being the number of the word in the sequence and k being the magnitude of the word, m being an integer between 1 and M, k being an integer between 1 and N, M and N being constants, said word sequences being digital representations of said signal segments;

a digital processor which transforms said word sequences into said entropy-related quantities, each of said entropy-related quantities being a monotonically-increasing function of entropy, entropy being obtained by (1) counting the number of words in the word sequence having a magnitude of k and dividing this number by M to obtain the quantity p(k) for each value of k, (2) obtaining the logarithm of p(k) for each value of k, (3) multiplying p(k) by the logarithm of p(k) for each value of k, (4) summing the products of p(k) and the logarithm of p(k) over the N values of k, and (5) taking the negative of the sum of the products.

2. The signal receiver of claim 1 further comprising a receiver front end which generates inphase and quadrature components of said electrical signal, the input to said ADC being said inphase and quadrature components, the output of said ADC being inphase and quadrature word sequences, the operations performed by said digital processor further comprising the combining of said inphase and quadrature word sequences into a combination word sequence, said combination word sequence being the subject of the operations performed by said digital processor in transforming said word sequences into said entropy-related quantities.

3. The signal receiver of claim 2 wherein said combination word sequence is obtained by selecting the larger of corresponding inphase and quadrature words.

4. The signal receiver of claim 2 wherein said combination word sequence is obtained by summing the absolute values of corresponding inphase and quadrature words.

5. The signal receiver of claim 2 wherein said combination word sequence is obtained by taking the square root of the sum of the squares of corresponding inphase and quadrature words.

6. The signal receiver of claim 1 wherein said electrical signal is comprised of a plurality of delayed and attenuated replicas of a periodic transmitted signal, the operations performed by said digital processor further comprising the averaging of a plurality of said signal segments to obtain an average signal segment, the beginnings of said signal segments being separated in time by an integral number of periods of said transmitted signal, the average signal segment being the subject of operations performed by said digital processor in calculating said entropy-related quantities.

7. The signal receiver of claim 1 wherein each of said signal segments has an origin, said signal receiver further comprising a display device which displays the magnitudes of said entropy-related quantities as a function of origin.

8. The signal receiver of claim 1 wherein each of said signal segments is associated with a propagation time, said signal receiver further comprising a display device which displays the magnitudes of said entropy-related quantities as a function of propagation time.

9. A system for detecting and characterizing wave emitter intensity and objects, discontinuities, and other inhomogeneities in a wave-propagating medium, said system comprising:

a wave-sensing means for converting waves received at said wave-sensing means through a predetermined solid angle into a received electrical signal;

a receiver which converts segments of said received signal into sequences of digital words, each of said word sequences w(m,k) being a digital representation of a signal segment, m being the number of the word in the sequence and k being the magnitude of the word, m being an integer between 1 and M, k being an integer between 1 and N, M and N being constants, and transforms each of a plurality of said word sequences into an entropy-related quantity, said entropy-related quantity being a monotonically-increasing function of entropy, entropy being obtained by (1) counting the number of words in the word sequence having a magnitude of k and dividing this number by M to obtain the quantity p(k) for each value of k, (2) obtaining the logarithm of p(k) for each value of k, (3) multiplying p(k) by the logarithm of p(k) for each value of k, (4) summing the products of p(k) and the logarithm of p(k) over the N values of k, and (5) taking the negative of the sum of the products;

a display means for displaying the magnitudes of said entropy-related quantities as a function of signal segment origin, the origin of said signal segments being determined from said predetermined solid angle, the changes in said entropy-related quantities corresponding to variations in the wave emitter intensity and to objects, discontinuities, and other inhomogeneities in the wave-propagating medium.

10. A method of using the system of claim 9 to detect variations in intensity of an electromagnetic emitter radiating from a point in space at a known frequency, said method comprising the steps:

selecting a wave-sensing means that responds to electromagnetic waves at the emitter frequency;

orienting said wave-sensing means so that emitter is within said receiving solid angle of said wave-sensing means;

observing the display of said entropy-related quantity over time;

interpreting localized changes in the entropy-related quantities displayed on said display means in terms of variations in intensity of an electromagnetic emitter.

11. A method of using the system of claim 9 to detect wave emitters in a region of space, said region of space subtending a solid angle at said probing system that is larger than said predetermined receiving solid angle of said wave-sensing means, said method comprising operations (A) and (B) performed simultaneously:

(A) operating equipment;
  (a) identifying N orientations of said wave-sensing means such that every portion of said region-of-space solid angle is within at least one of said N receiving solid angles;
  (b) placing said wave-sensing means in the n'th orientation;
  (c) operating said probing system for a predetermined time period;
  (d) setting $n = n_{modulo} N + 1$;
  (e) repeating steps (b) through (e);

B. interpreting localized changes in the entropy-related quantities displayed on said display means as emitters.

12. A probing system for detecting and characterizing objects, discontinuities, and other inhomogeneities in a wave-propagating medium, said probing system comprising:

a transmitter for generating an electrical signal;
a wave-generating means for converting said transmitter signal into transmitted waves propagated through a first solid angle in said wave-propagating medium;

a wave-sensing means for converting waves received at said wave-sensing means through a second solid angle into a received electrical signal, said received waves arising as a result of said transmitted waves being reflected or scattered by objects, discontinuities, and other inhomogeneities in said propagation medium;

a receiver which converts segments of said received signal into sequences of digital words, each of said word sequences w(m,k) being a digital representation of a signal segment, m being the number of the word in the sequence and k being the magnitude of the word, m being an integer between 1 and M, k being an integer between 1 and N, M and N being constants, and transforms each of a plurality of said word sequences into an entropy-related quantity, said entropy-related quantity being a monotonically-increasing function of entropy, entropy being obtained by (1) counting the number of words in the word sequence having a magnitude of k and dividing this number by M to obtain the quantity p(k) for each value of k, (2) obtaining the logarithm of p(k) for each value of k, (3) multiplying p(k) by the logarithm of p(k) for each value of k, (4) summing the products of p(k) and the logarithm of p(k) over the N values of k, and (5) taking the negative of the sum of the products;

a display means for displaying the magnitude of said entropy-related quantity as a function of signal segment origin, the origins of said signal segments being determined from said first and second solid angles and the time required to propagate said signal segments from said transmitter to said receiver, the changes in said entropy-related quantities corresponding to objects, discontinuities, and other inhomogeneities in said wave-propagating medium.

13. A method of using the probing system of claim 12 to detect objects, discontinuities, and other inhomogeneities in a region of space, said wave-generating means and said wave-sensing means being a single device called a wave-converting means, said first and second solid angles being substantially coincident, said region of space subtending a solid angle at said probing system that is larger than said first and second solid angles, said method comprising operations (A) and (B) performed simultaneously:

(A) operating equipment;
  (a) identifying N orientations of said wave-converting means such that every portion of said region-of-space solid angle is within at least one of said N transmitting/receiving solid angles;
  (b) placing said wave-converting means in the n'th orientation;
  (c) operating said probing system for a predetermined time period;
  (d) setting $n = n_{modulo} N + 1$;
  (e) repeating steps (b) through (e);

B. interpreting localized changes in the entropy-related quantities displayed on said display means as objects, discontinuities, or other inhomogeneities in said wave-propagating medium.

14. A method of using the probing system of claim 12 to detect objects, discontinuities, and other inhomogeneities in a region of space, said region of space subtending solid angles at said wave-generating means and at said wave-sensing means that are larger than said first and second solid angles, said method comprising operations (A) and (B) performed simultaneously:

(A) operating equipment;
  (a) identifying N orientation of said wave-generating means and M orientations of said wave-sensing means such that every portion of said region-of-space solid angle subtended by said wave-generating means is within at least one of said N first solid angles and such that every portion of said region-of-space solid angle subtended by said wave-sensing means is within at least one of said M second solid angles;
  (b) placing said wave-generating means in the n'th orientation and said wave-sensing means in the m'th orientation;
  (c) operating said probing system for a predetermined time period;
  (d) setting $m = m_{modulo\ M} + 1$;
  (e) setting $n = n_{modulo\ N} + 1$ if $m = 1$;
  (f) repeating steps (b) through (f);
B. interpreting localized changes in the entropy-related quantities displayed on said display means as objects, discontinuities, or other inhomogeneities in the wave-propagating medium.

15. A method for detecting changes in structure and level of a signal as a function of time comprising the steps:
  dividing said signal into time segments;
  converting each of said signal segments into at least one sequence of digital words $w(m,k)$, m being the number of the word in the sequence and k being the magnitude of the word, m being an integer between 1 and M, k being an integer between 1 and N, M and N being constants, said word sequences being digital representations of said signal segments;
  transforming each of said signal segments into an entropy-related quantity, said entropy-related quantity being a monotonically-increasing function of entropy, entropy being obtained by (1) counting the number of words in the word sequence having a magnitude of k and dividing this number by M to obtain the quantity $p(k)$ for each value of k, (2) obtaining the logarithm of $p(k)$ for each value of k, (3) multiplying $p(k)$ by the logarithm of $p(k)$ for each value of k, (4) summing the products of $p(k)$ and the logarithm of $p(k)$ over the N values of k, and (5) taking the negative of the sum of the products;
  displaying said entropy-related quantities for purposes of comparison, the differences in said entropy-related quantities corresponding to changes in said signal structure and/or level.

16. A method for detecting and characterizing wave emitter intensity and objects, discontinuities, and other inhomogeneities in a wave-propagating medium comprising the steps:
  converting waves arriving at a receiving point through a predetermined solid angle into a received electrical signal;
  dividing said electrical signal into time segments;
  converting each of said signal segments into at least one sequence of digital words $w(m,k)$, m being the number of the word in the sequence and k being the magnitude of the word, m being an integer between 1 and M, k being an integer between 1 and N, M and N being constants, said word sequences being digital representations of said signal segments;
  transforming each of said signal segments into an entropy-related quantity, said entropy-related quantity being a monotonically-increasing function of entropy, entropy being obtained by (1) counting the number of words in the word sequence having a magnitude of k and dividing this number by M to obtain the quantity $p(k)$ for each value of k, (2) obtaining the logarithm of $p(k)$ for each value of k, (3) multiplying $p(k)$ by the logarithm of $p(k)$ for each value of k, (4) summing the products of $p(k)$ and the logarithm of $p(k)$ over the N values of k, and (5) taking the negative of the sum of the products;
  determining the origin of each of said signal segments from said predetermined solid angle;
  displaying the magnitude of each of said entropy-related quantities as a function of origin;
  interpreting said changes in entropy-related quantities in terms of variations in wave emitter intensity and objects, discontinuities, and other inhomogeneities in the wave-propagating medium.

17. A method for detecting and characterizing objects, discontinuities, and other inhomogeneities in a wave-propagating medium comprising the steps:
  propagating waves from a transmitting point through a first solid angle in said wave-propagating medium;
  converting waves arriving at a receiving point through a second solid angle into an electrical signal, said arriving waves arising as a result of reflection or scattering of said propagated waves by objects, discontinuities, and other inhomogeneities in said wave-propagating medium;
  dividing said electrical signal into time segments;
  converting each of said signal segments into at least one sequence of digital words $w(m,k)$, m being the number of the word in the sequence and k being the magnitude of the word, m being an integer between 1 and M, k being an integer between 1 and N, M and N being constants, said word sequences being digital representations of said signal segments;
  transforming each of said signal segments into an entropy-related quantity, said entropy-related quantity being a monotonically-increasing function of entropy, entropy being obtained by (1) counting the number of words in the word sequence having a magnitude of k and dividing this number by M to obtain the quantity $p(k)$ for each value of k, (2) obtaining the logarithm of $p(k)$ for each value of k, (3) multiplying $p(k)$ by the logarithm of $p(k)$ for each value of k, (4) summing the products of $p(k)$ and the logarithm of $p(k)$ over the N values of k, and (5) taking the negative of the sum of the products;
  determining the mean propagation time between said transmitting and receiving points for each of said signal segments;
  determining the origin of each of said signal segments from said first and second solid angles and said mean propagation time;
  displaying the magnitude of each of said entropy-related quantities as a function of origin;
  interpreting said changes in entropy-related quantities in terms of objects, discontinuities, and other inhomogeneities in said wave-propagating medium.

* * * * *